United States Patent
Roberts (10) Patent No.: US 7,035,310 B1
(45) Date of Patent: Apr. 25, 2006

(54) GENERATING A CYCLIC SEQUENCE OF FREQUENCIES

(75) Inventor: David K. Roberts, Horley (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 716 days.

(21) Appl. No.: 09/630,895

(22) Filed: Aug. 2, 2000

(30) Foreign Application Priority Data

Aug. 4, 1999  (GB) .................................. 9918250

(51) Int. Cl.
H04B 1/713 (2006.01)
(52) U.S. Cl. ....................................... 375/132; 375/133
(58) Field of Classification Search ........ 375/131–356; 370/353, 343, 480, 496; 455/464
See application file for complete search history.

(56) References Cited

U.S. PATENT DOCUMENTS

| | | | | |
|---|---|---|---|---|
| 4,716,573 A * | 12/1987 | Bergstrom et al. | ........... | 375/132 |
| 5,235,613 A * | 8/1993 | Brown et al. | ........... | 375/135 |
| 5,377,221 A * | 12/1994 | Munday et al. | ........... | 375/133 |
| 5,394,433 A * | 2/1995 | Bantz et al. | ........... | 375/132 |
| 5,418,839 A * | 5/1995 | Knuth et al. | ........... | 455/464 |
| 5,425,049 A * | 6/1995 | Dent | ........... | 375/132 |
| 5,442,659 A * | 8/1995 | Bauchot et al. | ........... | 375/134 |
| 5,515,369 A * | 5/1996 | Flammer et al. | ........... | 370/480 |
| 5,537,434 A * | 7/1996 | Persson et al. | ........... | 375/134 |
| 5,937,002 A * | 8/1999 | Andersson et al. | ........... | 375/131 |
| 6,009,332 A * | 12/1999 | Haartsen | ........... | 455/450 |
| 6,023,622 A * | 2/2000 | Plaschke et al. | ........... | 455/452.2 |
| 6,031,883 A * | 2/2000 | Sanderford et al. | ........... | 375/344 |
| 6,058,137 A * | 5/2000 | Partyka | ........... | 375/131 |
| 6,111,909 A * | 8/2000 | Taki | ........... | 375/132 |
| 6,115,407 A * | 9/2000 | Gendel et al. | ........... | 375/132 |
| 6,115,408 A * | 9/2000 | Gendel et al. | ........... | 375/132 |
| 6,137,772 A * | 10/2000 | Turcotte et al. | ........... | 370/329 |
| 6,138,019 A * | 10/2000 | Trompower et al. | ........... | 455/436 |
| 6,188,715 B1* | 2/2001 | Partyka | ........... | 375/134 |
| 6,240,126 B1* | 5/2001 | Ohashi et al. | ........... | 375/132 |
| 6,249,540 B1* | 6/2001 | Dicker et al. | ........... | 375/133 |
| 6,298,081 B1* | 10/2001 | Almgren et al. | ........... | 375/132 |
| 6,480,721 B1* | 11/2002 | Sydon et al. | ........... | 455/464 |

FOREIGN PATENT DOCUMENTS

WO    WO9600467    1/1996

* cited by examiner

*Primary Examiner*—Emmanuel Bayard
*Assistant Examiner*—Lawrence B. Williams
(74) *Attorney, Agent, or Firm*—Aaron Waxler (57) ABSTRACT

A specific cyclic sequence of frequencies for use as a carrier hop sequence by a mobile station in a mobile radio communication system is chosen from a list of usable frequencies by means of a sequence of indices derived from the unique identifier of the mobile station. The indices are used to indicate respective positions in the list and hence to choose a succession of frequencies to make up one cycle of the cyclic sequence. The list is updated between successive choices of a frequency therefrom, making it possible to ensure, by appropriate exclusions from the list each time, that the succession of frequencies chosen satisfies predetermined constraints such as minimum hop distance and minimum stay-away time, either absolutely or to the maximum extent possible. Each index i may be derived from the unique identifier ID by means of an expression of the form $i = |f(ID, M)|$ modulo W, where M is the ordinal number, in the succession of frequencies, of the frequency being selected by that index and W is the current length of the list.

10 Claims, 6 Drawing Sheets

GENERATING A CYCLIC SEQUENCE OF FREQUENCIES

This invention relates to a method of generating a cyclic sequence of frequencies, in which method a number of frequencies are selected in succession from a list of usable frequencies by means of a sequence of indices indicating respective positions in the list, said sequence of indices being derived from a kernel, and a frequency generator arrangement is controlled to repeatedly generate the succession of frequencies so selected. The invention also relates to apparatus for carrying out such a method, to a cyclic sequence of frequencies generated by such a method or apparatus, and to a radio communication system which employs frequency hop sequences generated by a method or apparatus.

Communication systems are known in which a plurality of carrier frequency channels through a common transmission medium are shared between a plurality of communication nodes, for example between a plurality of mobile radio transmitter/receivers when they receive transmissions from, and/or send transmissions to, one or more transmitting/receiving base stations and/or each other. In order to provide simultaneously-occurring communications in such a system with at least some degree of independence in spite of the sharing of carrier frequency channels, so-called "frequency-hopping" can be employed; it is arranged that each transmitter hops to a different one of the available channels at regular intervals in accordance with a pre-defined cyclic sequence. This cyclic sequence is ideally different for each transmitter and ideally has a low cross-correlation with that used by any other transmitter. If the sequence employed by a given transmitter is known to a receiver with which that transmitter requires to communicate then the receiver can be arranged to hop its instantaneous reception carrier frequency in synchronism therewith, thereby enhancing the signal received from the given transmitter relative to signals received from any other transmitters which may be within range and transmitting at the same time. Similarly, if the sequence employed by a given receiver is known to a transmitter which requires to communicate with that receiver, then the transmitter can be arranged to hop its instantaneous transmission carrier frequency in accordance with that sequence, enabling the receiver to receive the transmission in an enhanced manner relative to signals received from any other transmitters which may be within range and transmitting at the same time.

Systems of this kind are known generally as frequency-hopping code-division multiple access (FH-CDMA) spread spectrum systems. If the information communicated through individual communication links in such systems by modulation of the appropriate repeating sequences of carrier frequencies is in digital form, the rate of frequency hopping may be faster than, slower than, or equal to the information bit rate.

Published patent application WO 96/00467 discloses a method of the general kind defined in the first paragraph, employed in such an FH-CDMA spread spectrum communication system. Each communication node in the system has an identifier or address assigned to it, includes a pseudo-random number generator, and also contains a system channel list, being a list in natural order of the carrier frequencies which are available for communications within the system. The pseudo-random number generators in all nodes are identical in respect of their operation, and are each designed to accept a seed value and a range value. When a given pseudo-random generator is supplied with a seed value and a range value and is activated, it generates a pseudo-random non-repeating sequence of integers in the given range, the actual sequence generated being determined by the seed value supplied.

When a node in the known system powers up it acquires communication links with other nodes by transmitting acquisition/synchronization packets on various system channels to any other nodes which can hear the transmission. These packets contain information about the source node, including a seed value derived from the source node's identifier and a "punch out list" of those carrier frequencies which are notionally available for use in the system but which the source node does not wish to use for receiving communications, for example because these frequencies are currently unable to robustly support communications to the source node.

When a target node receives such a packet it creates a sub-list from its system channel list, this sub-list being a list in natural order of carrier frequencies which are usable for communications to the particular source node. In other words the sub-list corresponds to the basic system channel list from which have been removed the carrier frequencies contained in the received punchout list. The pseudo-random generator in the target node is then supplied with the seed value received in the packet and a range value equal to the length of the sub-list and is activated to generate a pseudo-random sequence of numbers which are used as indices indicating respective positions in the sub-list to thereby select frequencies from the sub-list in succession. In this way the frequencies in the sub-list are placed in an order of succession determined by the particular sequence generated by the generator, which sequence, in turn, is determined by the seed value received from the source node. This sequence is then stored in a "link list" in the target node as being the frequency-hopping band plan to be used for transmissions to the source node. The source node uses its own seed value and punch-out mask in a similar way to establish its own frequency-hopping band plan for reception. Thus, because the same seed value and punch-out mask are used at both the source node and the target node the target node can be arranged, by reference to its link list, to use the source node's receiver frequency-hopping band plan for any transmissions it wishes to make to that source node.

The target node then transmits an acknowledgement/acquisition/synchronization packet to the source node using the source node's reception band plan, this packet giving the source node the target node's seed value and punch out list so that the source node can determine in a similar way the frequency-hopping band plan which is used for reception by the target node and store it in its own link list. In this way each node in the system establishes a link list containing the respective frequency-hopping band plans used for reception by all the other nodes within its communication range, and uses that list to determine the band plan to be used for subsequent transmissions to individual ones of these nodes.

A disadvantage with the known method is that, increasingly, regulations are imposing constraints on the properties of the frequency-hopping band plans which can be used in such systems, and it is difficult if not impossible to ensure that these constraints are satisfied when usable carrier frequencies are simply ordered into a sequence by means of a pseudo-random number generator. Examples of such constraints are minimum hop distance (the minimum frequency spacing permitted between each carrier frequency occurring in a given sequence and the next carrier frequency occurring in that sequence) and minimum stay-away time (the minimum number of frequency hops which must be present in a given sequence between the occurrence of each carrier frequency in that sequence and the occurrence in the sequence of any other carrier frequency which lies within the minimum hop distance of that frequency).

It is an object of the present invention to mitigate this disadvantage.

According to one aspect the invention provides a method of generating a cyclic sequence of frequencies, in which method a number of frequencies are selected in succession from a list of usable frequencies by means of a sequence of indices indicating respective positions in the list, said sequence of indices being derived from a kernel, in which a frequency generator arrangement is controlled to repeatedly generate the succession of frequencies so selected, and in which the list is updated in respect of the frequencies it contains between successive selections of a frequency therefrom, the detail of each updating being dependent upon the part of the succession of frequencies so far selected.

According to another aspect the invention provides apparatus for generating a cyclic sequence of frequencies, comprising a frequency selector for deriving a sequence of indices from a kernel and using these indices to indicate respective positions in a list of usable frequencies to thereby select a succession of frequencies from the list, and a frequency generator arrangement for repeatedly generating the succession of frequencies so selected, wherein the frequency selector includes a list updater for updating the list in respect of the frequencies it contains between successive selections of a frequency therefrom in such manner that the detail of each updating is dependent upon the part of the succession of frequencies so far selected.

Updating the list in respect of the frequencies it contains between successive selections of a frequency therefrom makes it possible to ensure that the succession of frequencies selected satisfies requirements such as minimum hop distance and minimum stay-away time either absolutely or to the maximum extent possible, while still allowing the various frequencies to be selected by means of a sequence of indices derived from a kernel.

It may be arranged that each updating is such as to result in a list which contains a respective subset of the frequencies contained in the list from which the first frequency of the succession of frequencies was selected, each updating is such as to result in a list from which is excluded any frequency which differs from the frequency last selected by less than a predetermined amount, and the updating immediately prior to the selection of the last frequency of the succession is such as to result in a list from which is also excluded any frequency which differs from the frequency first selected by less than said predetermined amount. If this is the case it can be ensured absolutely that the succession of frequencies selected exhibits a minimum hop distance equal to the predetermined amount. Suitably choosing additional exclusions can similarly ensure absolutely that the succession of frequencies selected satisfies additional constraints, for example a minimum stay-away time constraint and/or a requirement that the same frequency is not included more than once.

As an alternative it may be arranged that each updating is such as to result in a list which contains a respective subset of the frequencies contained in the list from which the first frequency of the succession of frequencies was selected and, if L denotes the required length of the complete succession of frequencies, l denotes the length of the part of the succession of L frequencies so far selected at any given time, and m is a predetermined integer greater than 1 and less than L, each updating which occurs when l<m is such as to result in a list from which is excluded all frequencies other than those which differ by less than a predetermined amount from the least number of the frequencies so far selected, each updating which occurs when m≦l≦(L−m) is such as to result in a list from which is excluded all frequencies other than those which differ by less than said predetermined amount from the least number of the (m−1) frequencies most recently selected, and each updating which occurs when (L−m)<l<L is such as to result in a list from which is excluded all frequencies other than those which differ by less than said predetermined amount from the least number of the (m−1) frequencies most recently selected and the m−(L−l) frequencies first selected. In this way it can be ensured that the succession of frequencies selected exhibits to the maximum extent possible (but not necessarily absolutely) a minimum hop distance equal to the predetermined amount and a minimum stay-away time equal to m. This can be advantageous in situations in which it is impossible to choose a succession of frequencies for which minimum hop distance and stay-away time requirements are satisfied absolutely for each member of the succession, and in which it will often be preferable to relax the minimum hop distance and stay-away requirements so as to enable a succession still to be chosen, rather than fail to choose a succession at all. Suitably choosing additional exclusions can similarly ensure that the succession of frequencies selected also satisfies additional constraints to the maximum extent possible, for example a requirement that the same frequency is not included more than once.

Embodiments of the invention will now be described, by way of example, with reference to the accompanying diagrammatic drawings in which.

MODES FOR CARRYING OUT THE INVENTION

Figure 1:
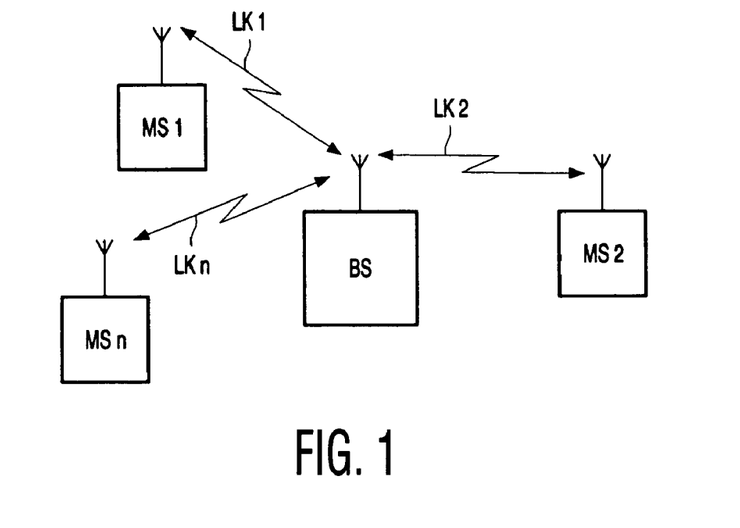
FIG. 1 is a diagram of a mobile radio communication system.

In FIG. 1 a mobile radio communication system comprises a base station BS and a number n of mobile stations MS of which three, MS1, MS2 and MSn are shown. Bi-directional communications between the base station BS and the mobile stations MS1,MS2, . . . ,MSn occur over multiple radio communication links LK1,LK2, . . . , LKn respectively.

Figure 2:
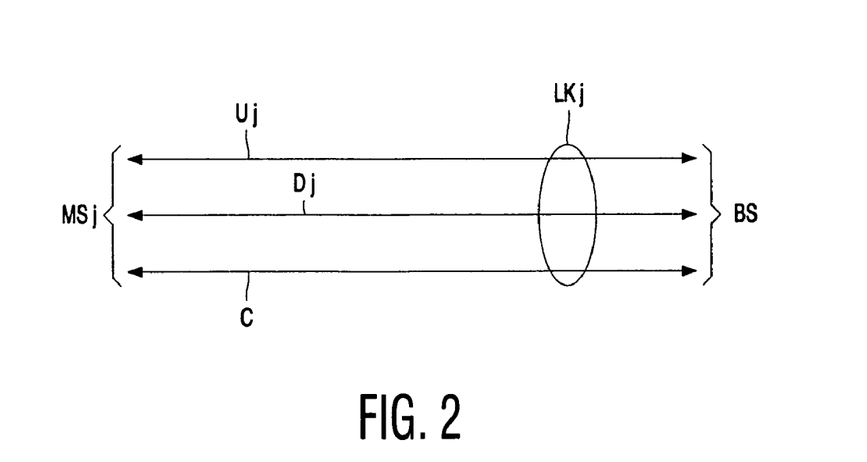
FIG. 2 shows a multiple radio communication link included in the system of FIG. 1 in more detail.

As shown in FIG. 2, each multiple link LKj (j=1,2, . . . ,n) comprises a unidirectional frequency-hopping radio uplink Uj from the corresponding mobile station MSj to the base station BS, a unidirectional frequency-hopping radio downlink Dj from the base station BS to the corresponding mobile station MSj, and a bi-directional control radio link C which is common to all the mobile stations MS.

A different cyclic frequency-hop sequence is used for each of the uplinks Uj and downlinks Dj to enable signals to be received over each of these links without undue interference from any signals being transmitted at the same time over any other of these links. The frequencies included in the various uplink cyclic hop sequences are all selected from a first set of p equally-spaced carrier frequencies which lie within a first frequency band, and the frequencies included in the various downlink cyclic hop sequences are all selected from a second set of q equally-spaced carrier frequencies which lie within a second frequency band, where p may or may not be equal to q. The first and second frequency bands are non-overlapping although this is not essential; the first and second sets of frequencies may even be the same. The first band of carrier frequencies is therefore shared between all the uplinks, and the second band of carrier frequencies is similarly shared between all the downlinks. It may even be the case that two or more uplink and/or downlink cyclic hop sequences include exactly the same set of frequencies, albeit in a different order.

In order to allow any cyclic hop sequence to be assigned to any mobile station as and when required each of the mobile stations MSj includes first and second controllable frequency generator arrangements (not shown in FIG. 2). Each such first generator arrangement is controllable to generate at will any frequency of the first set, and each such second generator arrangement is controllable to generate at will any frequency of the second set. The base station BS includes banks of such first and second controllable frequency generator arrangements (again not shown in FIG. 2) so that it may communicate with several mobile stations at the same time.

The control link C does not employ frequency-hopping, but instead uses a constant carrier frequency or frequency pair which lies outside the boundaries of the frequency bands used for the uplinks Uj and the downlinks Dj. Information may, for example, be transmitted over the control link C in the form of packets whose headers include the identity of the destination mobile station MSj in the case of transmissions from the base station BS to particular mobile stations, and the identity of the source mobile station MSj in the case of transmissions from a mobile station to the base station BS. Each mobile station in the system is assigned a unique identifier which is stored in the relevant mobile station.

Figure 3:
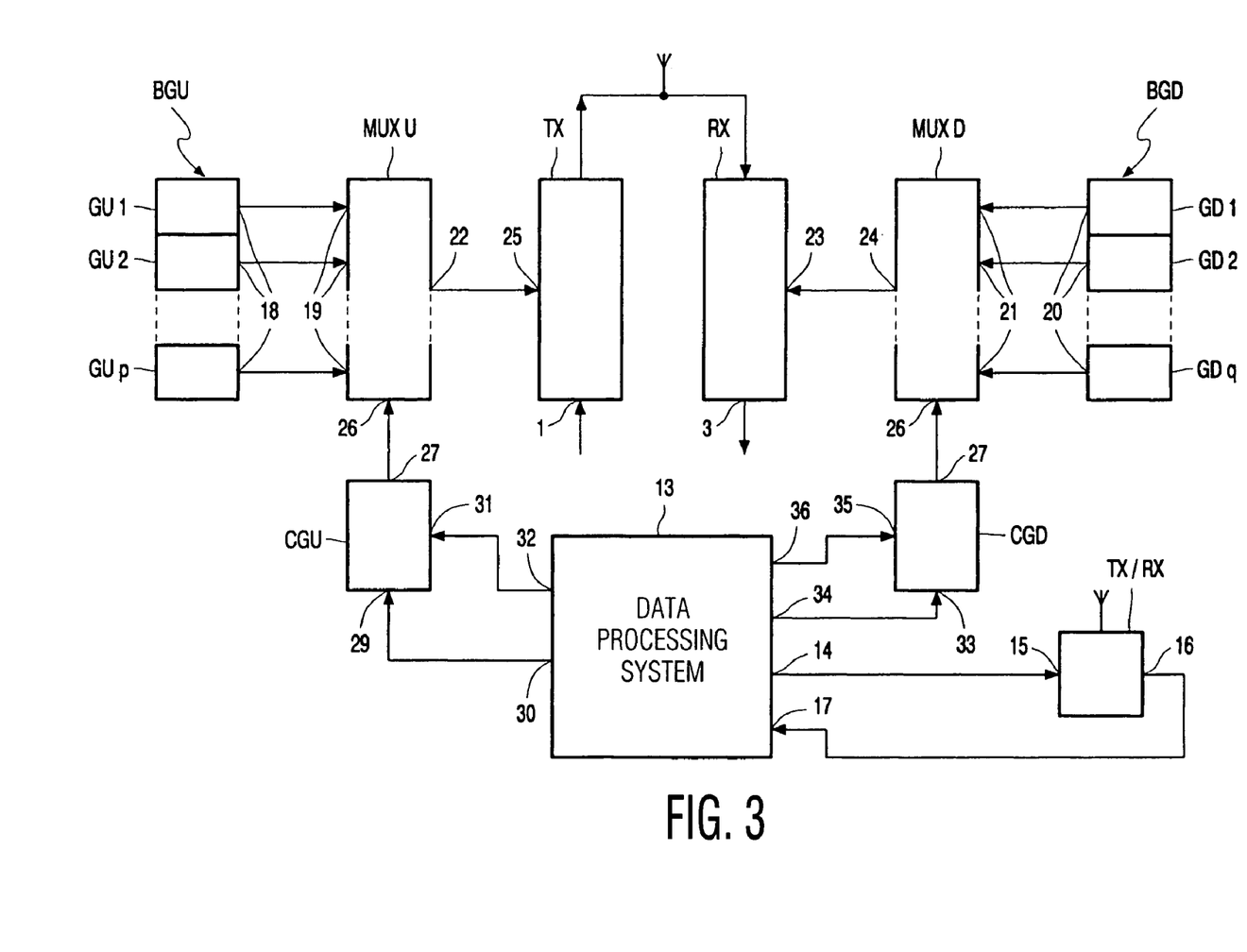
FIG. 3 shows a mobile station included in the system of FIG. 1 in more detail.

FIG. 3 shows an exemplary one of the mobile stations MS of FIG. 1 in more detail. The mobile station includes a radio transmitter TX for transmitting information on the corresponding uplink Uj of FIG. 2, a receiver RX for receiving information from the corresponding downlink Dj of FIG. 2, and a further transmitter/receiver TX/RX for transmitting information on, and receiving information from, the control channel C of FIG. 2.

An information signal input 1 of the transmitter TX is fed with information to be transmitted from the mobile station, via the base station BS, to another mobile station in the system or to a destination external to the system, for example a destination served by a public switched telephone network (PSTN) to which the system may be connected. This information may be, for example, speech from the microphone of a handset (not shown) included in the mobile station. Similar information travelling in the opposite direction and received by the mobile station appears on an information signal output 3 of the receiver RX. Thus output 3 may, for example, be connected to the earpiece of the aforesaid handset. An information signal input 15 of the transmitter section of the control channel transmitter/receiver TX/RX is fed with control information from an output 14 of a suitably programmed data processing system 13, and an information signal output 16 of the receiver section of transmitter/receiver TX/RX supplies control information to an input 17 of processing system 13.

As mentioned previously, the uplinks Uj and the downlinks Dj each employ carrier frequency hopping, the frequencies used in the various uplink cyclic hop sequences being chosen from a first set of p equally-spaced carrier frequencies and the frequencies used in the various downlink cyclic hop sequences being chosen from a second set of q equally-spaced carrier frequencies. In order to implement this the mobile station MS of FIG. 3 includes a bank BGU of carrier frequency generators GU1,GU2, . . . ,GUp which generate respective ones of the p frequencies of the first set on a continuous basis, and a bank BGD of carrier frequency generators GD1,GD2, . . . GDq which generate respective ones of the q frequencies of the second set on a continuous basis. The station MS furthermore includes a multiplexer MUXU and a multiplexer MUXD the outputs 22 and 24 respectively of which are connected to a carrier signal input 25 of the transmitter TX and to a mixer signal input 23 of the receiver RX respectively. The outputs 18 of the generators GU1,GU2, . . . ,GUp are connected to respective inputs 19 of the multiplexer MUXU, and the outputs 20 of the generators GD1,GD2, . . . ,GDq are connected to respective inputs 21 of the multiplexer MUXD. Each multiplexer MUXU and MUXD is provided with a control or switching signal input 26. These inputs are supplied from the outputs 27 of clockable control or switching signal generators CGU and CGD respectively. The bank BGU of carrier frequency generators and the multiplexer MUXU together constitute a first controllable frequency generator arrangement for generating at will any frequency of the first set of carrier frequencies at the output 22. Similarly the bank BGD of carrier frequency generators and the multiplexer MUXD together constitute a second controllable frequency generator arrangement for generating at will any frequency of the second set of carrier frequencies at the output 24.

The control or switching signal generators CGU and CGD are programmable, and are constructed to repeatedly generate a sequence of control signals at their (multi-line) outputs 27 when clocked, thereby causing the corresponding multiplexer MUXU or MUXD to connect the outputs 18 or 20 of a selection of the generators of the bank BGU or the bank BGD sequentially and cyclically to the input 25 or 23 of the corresponding transmitter TX or receiver RX. The length and content of each sequence of control signals generated is determined by the current programming of the relevant generator CGU or CGD. Generator CGU is provided with a programming signal input 29 which is connected to an output 30 of processing system 13, and with a clock signal input 31 which is connected to an output 32 of system 13. Similarly, generator CGD is provided with a programming signal input 33 which is connected to an output 34 of processing system 13, and with a clock signal input 35 which is connected to an output 36 of system 13. Generators CGU and CGD may, for example, be constituted by respective programmable-length programmable-contents cyclic shift registers implemented in software.

Figure 4:
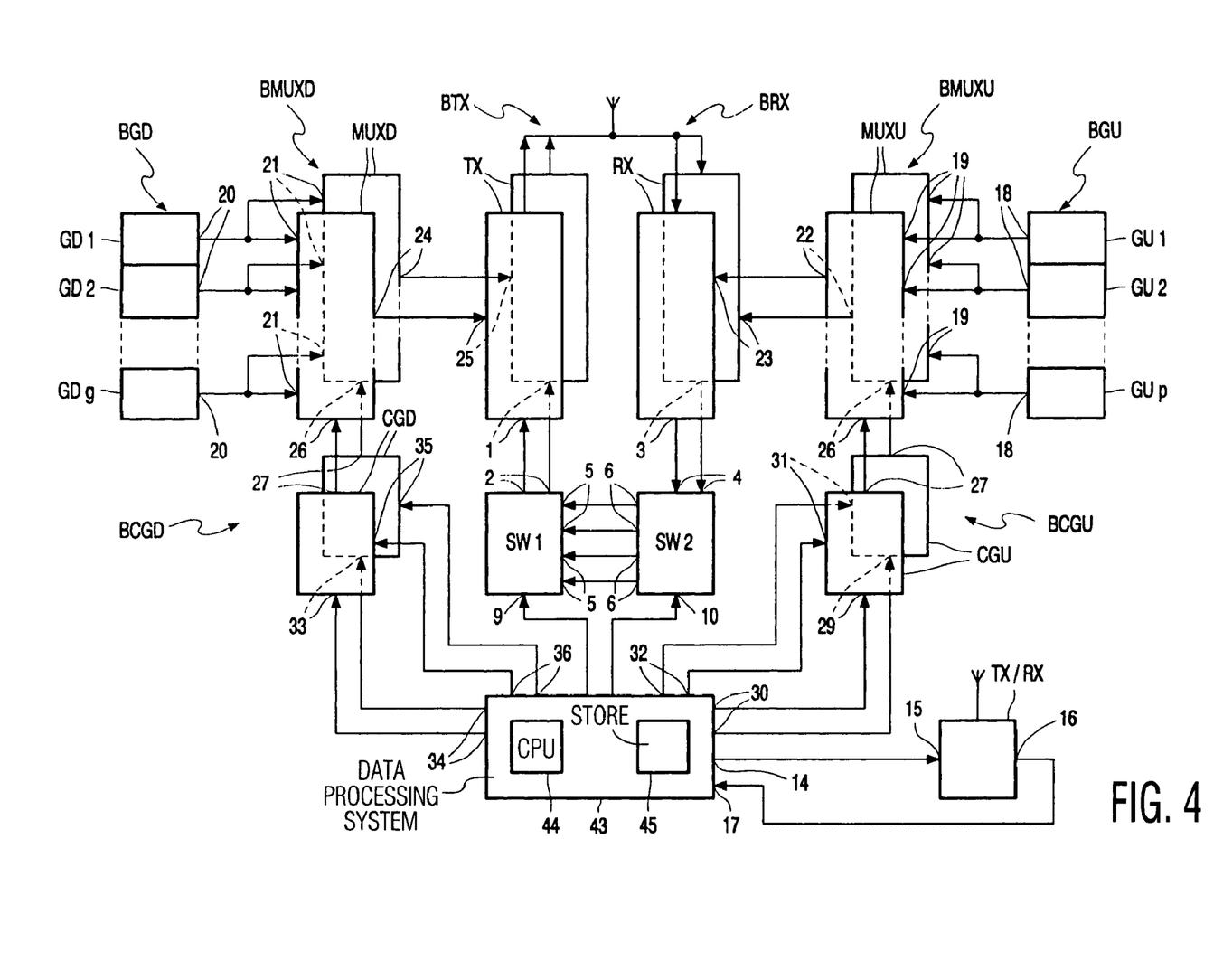
FIG. 4 shows a base station included in the system of FIG. 1 in more detail.

FIG. 4 shows the base station BS of FIG. 1 in more detail. The base station contains many components which are similar or identical to components of the mobile station of FIG. 3, at least in respect of their function. Insofar as this is the case, these components have been referenced identically in both FIG. 3 and FIG. 4 and will not be discussed again unless further description is required in the context of FIG. 4.

Several of the differences between the mobile station MS of FIG. 3 and the base station BS of FIG. 4 result from the facts that (a) the base station has to be capable of communicating with several mobile stations at the same time, i.e. it has to be capable of receiving information from several uplinks Uj and transmitting information on several downlinks Dj at the same time, and (b) whereas a mobile station transmits on an uplink Uj and receives on a downlink Dj, the converse is the case with the base station BS. A consequence of (a) is that, whereas the mobile station of FIG. 3 includes a single transmitter TX, a single receiver RX, single multiplexers MUXU and MUXD, and single control signal generators CGD and CGU, the base station of FIG. 4 includes banks BTX, BRX, BMUXU, BMUXD, BCGD and BCGU respectively of these components. (In FIG. 4 only two of the relevant items have been shown in each of these banks, for the sake of clarity). A consequence of (b) is that, whereas in the mobile station of FIG. 3 the outputs 22 and 24 of the multiplexers MUXU and MUXD respectively are coupled to the inputs 25 and 23 of the transmitter TX and the receiver RX respectively, in the base station of FIG. 4 the outputs 22 and 24 of the multiplexers of the multiplexer banks BMUXU and BMUXD respectively are coupled to the inputs 23 and 25 of corresponding receivers in the receiver bank BRX and corresponding transmitters in the transmitter bank BTX respectively.

Bank BMUXU includes a multiplexer corresponding to each receiver in the bank BRX and bank BMUXD includes a multiplexer corresponding to each transmitter in the bank BTX. Bank BCGU includes a control signal generator corresponding to each multiplexer in the bank BMUXU and bank BCGD includes a control signal generator corresponding to each multiplexer in the bank BMUXD. The outputs 18 of the carrier frequency generators GU1,GU2, . . . ,GUp are each connected to a corresponding input 19 of each of the multiplexers MUXU, and the outputs 20 of the carrier frequency generators GD1,GD2, . . . ,GDq are each connected to a corresponding input 21 of each of the multiplexers MUXD. Each multiplexer MUXU in the bank BMUXU constitutes, together with the bank BGU of carrier frequency generators, a respective first controllable frequency generator arrangement for generating at will any frequency of the aforesaid first set of carrier frequencies at its output 22. Similarly each multiplexer MUXD in the bank BMUXD constitutes, together with the bank BGD of carrier frequency generators, a respective second controllable frequency generator arrangement for generating at will any frequency of the aforesaid second set of carrier frequencies at its output 24.

In the base station BS of FIG. 4 each of the radio transmitters TX in the bank BTX is assignable to any one of the downlinks Dj of FIG. 2 for transmitting information thereon, and each of the radio receivers in the bank BRX of radio receivers RX is assignable to any one of the uplinks Uj of FIG. 2 for receiving information therefrom. This is achieved by appropriately programming the corresponding control or switching signal generators CGD and CGU as and when required.

The information signal inputs 1 of the transmitters TX are connected to respective outputs 2 of a first multi-input multi-output controllable switch SW1, and the information signal outputs 3 of the receivers RX are connected to respective inputs 4 of a second multi-input multi-output controllable switch SW2. Respective information signal inputs 5 of the switch SW1 are connected to respective outputs 6 of the switch SW2. If desired, switch SW1 may be provided with further inputs (not shown) for receiving information signals from outside the system, for example voice signals from respective channels of a public switched telephone network (PSTN). Similarly switch SW2 may be provided with further outputs for transmitting information out of the system, for example onto respective channels of the aforementioned PSTN.

Switches SW1 and SW2 function as cross-bar or matrix type switches. Thus switch SW1 is controllable by the application of control signals to a control input 9 thereof to selectively connect any of its inputs 5 to any of its outputs 2. Similarly, switch SW2 is controllable by the application of control signals to a control input 10 thereof to selectively connect any of its inputs 4 to any of its outputs 6. Control inputs 9 and 10 are connected to outputs 11 and 12 respectively of a suitably programmed data processing system 43 which includes a central processing unit (CPU) 44 and storage 45. Thus the application of appropriate control signals to the control inputs 9 and 10 by processing system 43 can cause any of the outputs 3 of the receivers RX to be coupled to any of the inputs 1 of the transmitters TX.

The processing system 13 in each mobile station MSj is programmed so that, when a mobile station is turned on by a user, a log-on request is sent by the mobile station to the base station BS over the control channel C, this request containing the unique identifier of the requesting mobile station. The processing system 43 in the base station is programmed to respond to such a log-on request by (a) choosing respective cyclic frequency-hop sequences for both a downlink Dj to the requesting mobile station and an uplink Uj from the requesting mobile station in a manner which will be described below, (b) recording details of the chosen downlink and uplink cyclic hop sequences in storage as being those which currently correspond to the requesting mobile station, and (c) sending these details to the requesting mobile station over the control channel C.

The processing system 13 in each mobile station MSj is programmed to respond to the arrival over the control channel of such details addressed to the relevant mobile station by programming the mobile station's control signal generators CGD and CGU to repeatedly generate, when they are clocked, respective sequences of control signals which are such that the mobile station's multiplexer MUXD produces the chosen downlink cyclic hop sequence at its output 24 and the mobile station's multiplexer MUXU repeatedly produces the chosen uplink cyclic hop sequence at its output 22.

Subsequently, when the user of the mobile station activates the station to make a call, the mobile station's processing system 13 starts to clock its control signal generators CGU and CGD and also causes a call request containing the desired destination of the call to be sent to the base station over the control channel C. The processing system 43 in the base station responds by (a) looking up the cyclic frequency-hop sequences previously chosen for the downlink to the requesting mobile station and the uplink from the requesting mobile station, (b) assigning a currently free transmitter TX of the bank BTX to the requesting mobile station by programming and clocking the corresponding control signal generator CGD of the bank BCGD to repeatedly generate a sequence of control signals which is such that the corresponding multiplexer MUXD of the bank BMUXD produces the chosen downlink cyclic hop sequence at its output 24, (c) assigning a currently free receiver RX of the bank BRX to the requesting mobile station by programming and clocking the corresponding control signal generator CGU of the bank BCGU to repeatedly generate a sequence of control signals which is such that the corresponding multiplexer MUXU of the bank BMUXU produces the chosen uplink cyclic hop sequence at its output 22, and (d) controlling the switches SW1 and SW2 in accordance with the assigned transmitter TX and receiver RX and the desired destination of the call.

The base station BS responds in a similar way to a request for a call to a logged-on mobile station, additionally in this case sending an activation request to the destination mobile station over the control channel C to cause the mobile station to start clocking its control signal generators CGU and CGD.

When a call is terminated the relevant mobile station ceases the clocking of its control signal generators CGU and CGD and the base station ceases the clocking of those of its control signal generators CGU and CGD which have been assigned to the mobile station for the duration of the call.

In summary, the result of a given mobile station being turned on is that uplink and downlink communication channels are notionally set up between the mobile station and the base station, using respective cyclic frequency-hop sequences which are newly chosen in the base station in response to the log-on request sent by the mobile station. Thereafter these channels can be used by the mobile station for communications, via the base station, with other mobile stations in the system and, if the switches SW1 and SW2 are respectively provided with the aforementioned further inputs for receiving information from outside the system and further outputs for transmitting information out of the system, with stations external to the system, for example with subscribers to a PSTN. Such communications may be set up by the mobile station sending appropriate requests to the base station over the control channel C, by other mobile stations in the system sending appropriate requests to the base station over the control channel, or by appropriate requests being sent to the base station from outside the system, the processing system 43 in the base station being programmed to respond to such requests by assigning one of its transmitters TX and receivers RX to the mobile station for the duration of the call and appropriately controlling the switches SW1 and SW2.

In a first embodiment of the invention the uplink and downlink cyclic frequency-hop sequences for each mobile station MS which sends a log-on request to the base station BS are chosen in the base station from the frequencies generated by the various generators in the banks BGU and BGD respectively in a manner which will now be described with reference to FIGS. 5 and 6 of the drawings. It will be assumed that the (equally-spaced) frequencies generated by successive ones of the generators GU1,GU2, . . . ,GUp of the bank BGU are in increasing order, as are the (equally-spaced) frequencies generated by successive ones of the generators GD1,GD2, . . . ,GDq of the bank BGD. For simplicity it will furthermore be assumed initially (a) that the first and second sets contain the same number p of carrier frequencies, i.e. that q=p, (b) that all of these frequencies are actually usable; e.g. the radio spectrum is currently free from damaging interference on all of these frequencies (c) that one cycle of each sequence is required to consist of the same number L of different frequencies, (d) that each cyclic sequence must exhibit the same minimum hop distance (minimum frequency difference between any two frequencies occurring next to each other in the cycling sequence) equal to r times the basic spacing between the frequencies of the relevant set, and (e) that each cyclic sequence must exhibit the same minimum stay-away time (minimum number of frequency hops which must be present in the cycling sequence between the occurrence of any frequency and the occurrence of any other frequency which is within the minimum hop distance of that frequency) equal to m.

Figure 5:
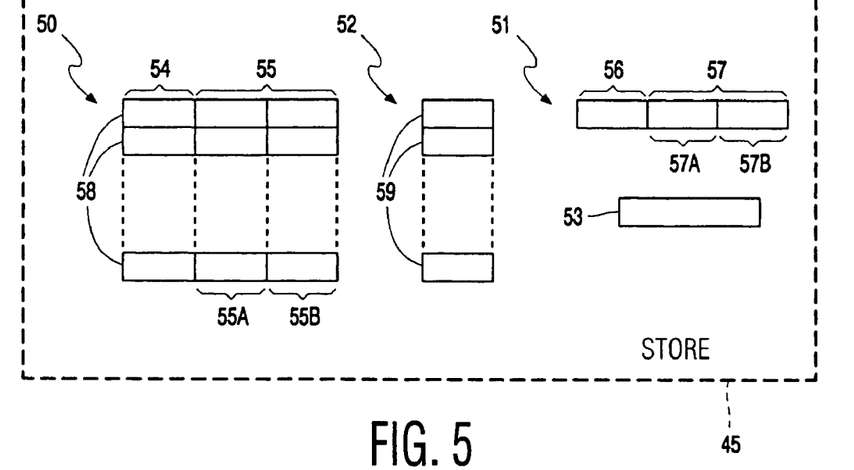
FIG. 5 shows some items which are included in a data processing system forming part of the base station of FIG. 4 in a first embodiment of the invention.

As shown diagrammatically in FIG. 5, in the first embodiment of the invention the storage 45 in the base station data processing system 43 includes areas 50, 51, 52 and 53. Records of the mobile stations which are currently logged on to the mobile radio system together with details of (one cycle of) their respective cyclic hop sequences are stored in respective fields 58 of area 50. The unique identifiers (IDs) of the mobile stations are stored in a sub-field 54 of the corresponding field 58 and the corresponding hop sequences, represented by the ordinal numbers in the banks BGU and BGD of the corresponding frequency generators, are stored in a sub-field 55 of the corresponding field 58. It will be assumed initially that these representations (but not the actual frequency sequences) can be identical in respect of both the uplink sequence and the downlink sequence for each given mobile station, this being a consequence of the assumptions set forth in the preceding paragraph. A field 56 of area 51 stores the ID of any mobile station which has sent a log-on request and for which uplink and downlink sequences are currently being chosen, and a field 57 stores any part of such a sequence which has been chosen so far. Area 52 stores a list of possible candidates (again represented by the ordinal numbers in the banks BGU and BGD of the corresponding frequency generators) for the next member of any sequence currently being built up in field 57, the successive entries in the list being stored in successive fields 59 of area 52. Area 53 stores the current content of a software-implemented counter.

Figure 6:
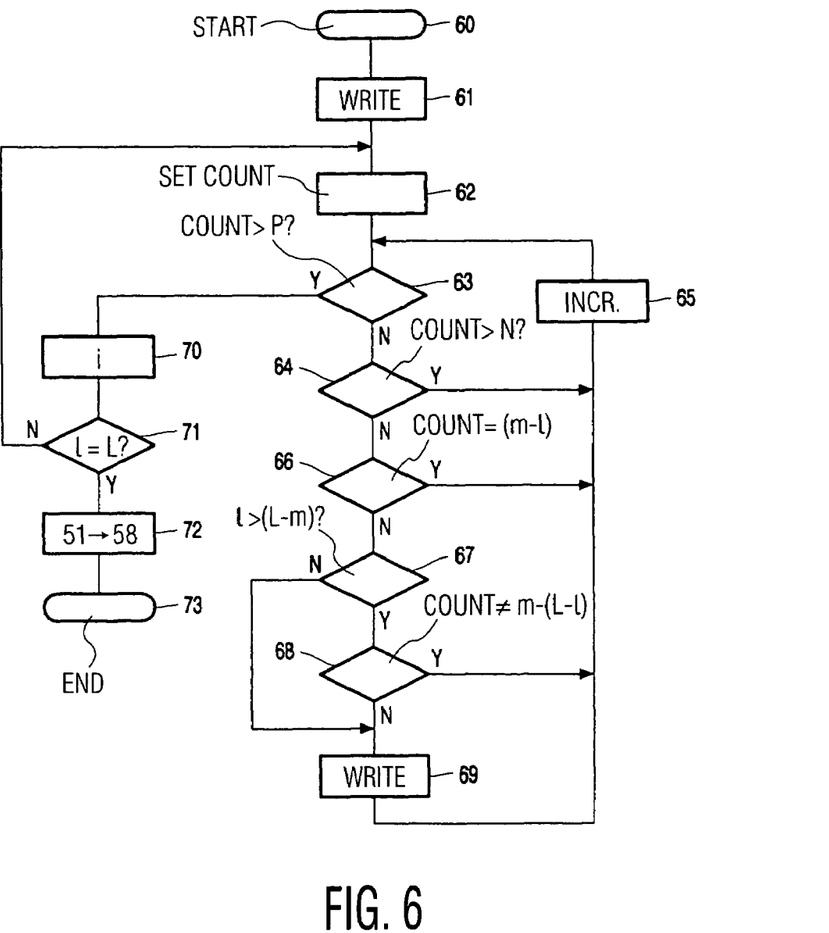
FIG. 6 is a flow diagram showing operations which the data processing system is programmed to perform in the first embodiment of the invention.

In the first embodiment of the invention the processing system 43 of FIG. 4 is programmed to perform the operations set forth in the flow diagram of FIG. 6 of the drawings when the base station receives a log-on request from a mobile station. In FIG. 6 the various items have the following significances.

60. Start.
61. Write ID of logging-on mobile station into field 56 of storage area 51.
62. Set count in counter 53 to 1. Clear any list in storage area 52.
63. Is the count in counter 53 greater than the number p of frequencies in the relevant set of carrier frequencies, i.e. the number of frequencies which are available for inclusion in the hop sequence being chosen?
64. Is the count in counter 53 the same as a number already present in the part-sequence in field 57 of storage area 51?
65. Increment counter 53.
66. Does the count in counter 53 differ from any of the last (m−1) numbers in the part-sequence in field 57 of storage area 51 by less than r?
67. Is l greater than (L−m), where l is the current length of the part-sequence in field 57 of storage area 51?
68. Does the count in counter 53 differ from any of the first m−(L−l) numbers in the part-sequence in field 57 of storage area 51 by less than r?
69. Write the contents of counter 53 into list 52 as the next entry.
70. Calculate i where i=|f(ID)| modulo (the number W of entries in list 52). Add the ith entry in list 52 to the sequence in field 57 of area 51.
71. Is the current length l of the sequence in field 57 of area 51 equal to the required sequence length L?

72. Move the contents of the storage area 51 into an empty field 58 in storage area 50.
73. End.

After the ID of the logging-on mobile station has been written into field 56 of storage area 51 in step 61, repeated circuits around the loop which includes step 65 result in successive entries being written into the storage area 52, i.e. into the list of possible candidates for the next frequency to be added to the hop sequence being built up for the mobile station in field 57 of storage area 51. Test 64 ensures that no frequency is included in the sequence more than once. Tests 66–68 ensure that the minimum hop distance and minimum stay-away requirements are met for the next frequency to be added, test 66 ensuring that this is the case with regard to the immediately preceding frequencies in the part of the sequence already chosen and tests 67–68 ensuring that this will also be the case with regard to immediately following frequencies occurring in a new cycle of the completed sequence. Each time test 63 indicates that all possible candidates have been included in the list in storage area 52, i.e. that the updating of the list in storage area 52 has been completed, one of these candidates is chosen or selected in step 70 and added to the sequence being built up in field 57 of storage area 51. Test 71 then determines whether the sequence being built up is of the required length. If this is not the case (N) the procedure for choosing or selecting the next member of the sequence is started. Otherwise (Y) the ID of the logging on mobile station together with the hop sequence which has been chosen for it is written into an empty field 58 in storage area 50 in step 72.

It will be noted that each index i used in step 70 to choose the next frequency to be added to the sequence being chosen for the logging on mobile station is a function f of the unique identifier (ID) of that station. The use in this way of a unique kernel ID from which to derive the successive values of i makes it highly unlikely that the same frequency hop sequence will, by chance, be chosen for more than one mobile station. For simplicity f(ID) may be chosen to be equal to ID itself, although it will be evident that other functions may be used. In order to increase the randomness of the frequencies in the sequence being chosen each value of i is preferably also a function of the position, in the sequence being chosen, of the frequency being selected by that value of i. An advantageous choice for f(ID) in this respect, provided that ID is non-zero, has been found to be f(ID)={M*(ID)+N+1}, where M is the ordinal number in the sequence of the frequency currently being chosen (M=1 when choosing the first frequency of the sequence, M=2 when choosing the second frequency, and so on), and N is the number of carrier frequencies in the list from which the first member of the sequence is chosen (N=p=q in the present example). An alternative or additional way to increase the randomness of the frequencies in the sequence being chosen is to remove a randomly chosen selection of entries from the list 52 (and collapse the reduced list 52 which results) immediately prior to each of at least the first few occurrences of step 70. As another alternative ID may be used to seed a pseudo-random number generator which is then clocked to generate the successive values of i.

The details of the tests carried out in steps 64 and 66–68 of FIG. 6 are determined by the constraints which it is desired to impose on the sequence being chosen, in the present case constraints in respect of non-inclusion of a frequency more than once, and in respect of minimum hop distance r, and in respect of minimum stay-away time m. It will be evident that other or additional constraints may be applicable in particular cases. For example, if it is permissible for the same frequency to be included in the sequence more than once, step 64 may be omitted. As another example, if the number of frequencies available for inclusion in a sequence is not much greater than the required sequence length L, making it difficult to choose a sequence for which the minimum hop distance and stay-away time requirements are satisfied for each member of the sequence, the chances of successfully choosing a sequence having the required properties may be improved by modifying tests 66 and 68 so that they additionally include a test for maximum hop distance, so that frequencies which would otherwise qualify for inclusion in the list 52 are excluded if they would result in a hop distance which is greater than this maximum (the value of which can be chosen in accordance with the prevailing circumstances).

As mentioned previously, it has been assumed so far that the representations of the uplink and downlink hop sequences (the ordinal numbers in the banks BGU and BGD of the corresponding frequency generators) can be identical in respect of both the uplink sequence and the downlink sequence for each given mobile station, with the consequence that the routine of FIG. 6 has to be implemented only once for each logging on mobile station. However this may not always be the case, for example because the first and second sets of carrier frequencies contain different numbers of these frequencies or because some of these frequencies are actually unusable, and/or because mutually different conditions are imposed on the uplink and downlink sequences in respect of their cycle lengths L, their minimum hop distances r, and/or their minimum stay-away times m. If this is so it will be necessary to implement the routine of FIG. 6 twice for each logging on mobile station, once to choose the uplink frequency-hop sequence therefor and once to choose the downlink frequency-hop sequence therefor. In such a case the sub-fields 55 of the fields 58 in FIG. 5 may comprise two parts 55A and 55B, one for storing the uplink sequences and the other for storing the downlink sequences, as indicated by a dashed line, and the field 57 of area 51 in FIG. 5 may comprise two parts 57A and 57B in a similar manner.

As mentioned above there may be circumstances, for example if the number of frequencies available for inclusion in a sequence is not much greater than the required sequence length L, when it may be difficult to choose a sequence for which the minimum hop distance and stay-away time requirements are satisfied for each member of the sequence. Indeed, such a choice may even be impossible. In such circumstances it will often be preferable to relax the minimum hop distance and stay-away requirements so as to enable a sequence still to be chosen, rather than fail to choose a sequence at all. In accordance with a second embodiment of the invention FIGS. 7 and 8 of the drawings show modified versions of the storage 45 of FIG. 5 and the flow diagram of FIG. 6 respectively which, together, provide for such relaxation to occur when required.

Figure 7:
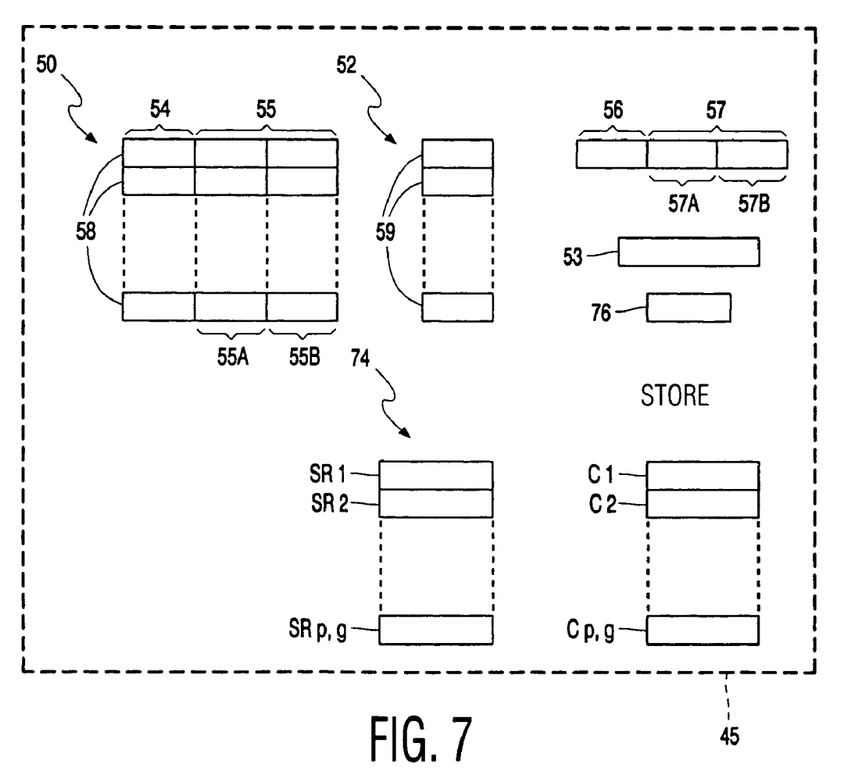
FIG. 7 shows some items which are included in the data processing system in a second embodiment of the invention.

Many of the items shown in FIG. 7 have counterparts in FIG. 5 and, where this is the case, the same reference numerals have been used in the two Figures. In addition to the area 50 with its fields 58 and sub-fields 54 and 55, the area 51 with its fields 56 and 57, the area 52 with its fields 59, and the area 53, the storage 45 of FIG. 7 includes a bank 74 of software-implemented shift registers SR1, SR2, . . . , SRp,q a bank 75 of software-implemented counters C1, C2, . . . ,Cp,q and a storage area 76. For simplicity it will again be assumed (a) that the first and second sets of carrier frequencies available for inclusion in uplink and downlink hop sequences respectively both contain the same number p of carrier frequencies, i.e. that q=p, (b) that all of these frequencies are actually usable; e.g. the radio spectrum is currently free from damaging interference on all of these frequencies (c) that one cycle of each sequence is required to consist of the same number L of different frequencies, (d) that each cyclic sequence must exhibit the same minimum hop distance (minimum frequency difference between any two frequencies occurring next to each other in the cycling sequence) equal to r times the basic spacing between the frequencies of the relevant set, and (e) that each cyclic sequence must exhibit the same minimum stay-away time (minimum number of frequency hops which must be present in the cycling sequence between the occurrence of any frequency and the occurrence of any other frequency which is within the minimum hop distance of that frequency) equal to m.

The bank 74 of shift registers in FIG. 7 includes a shift register corresponding to each carrier frequency which is available for inclusion in a given hop sequence. Thus, with the above assumption (a), it comprises p shift registers SR. Similarly the bank 75 of counters includes a counter corresponding to each carrier frequency which is available for inclusion in a given hop sequence. Thus, with the above assumption (a), it comprises p counters C. Each shift register SR has a number of stages equal to one less than the minimum stay-away time m. The storage area 76 is used, during the choice of each successive member of a hop sequence, for storing the lowest count value present in any of the counters C.

Figure 8:
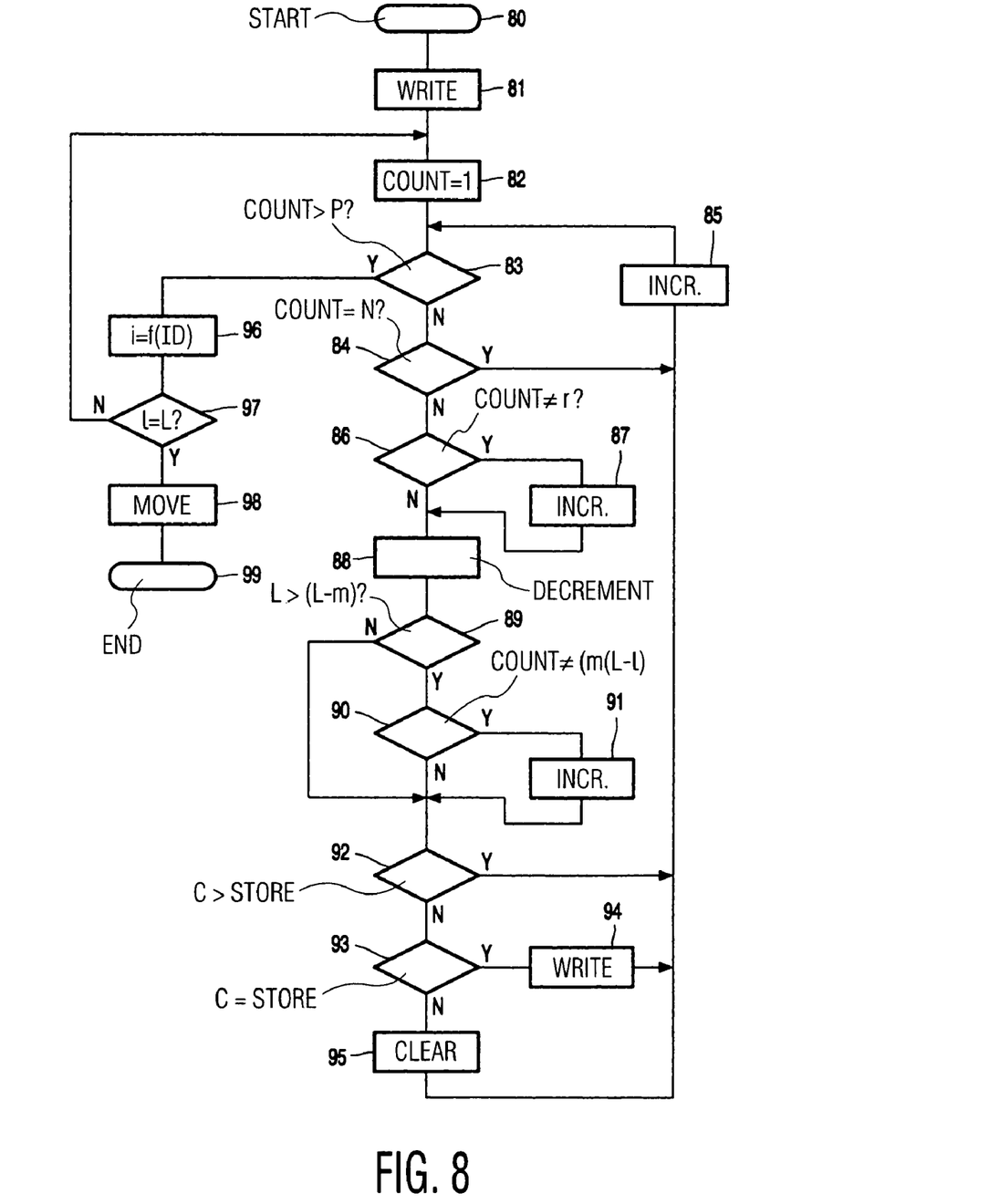
FIG. 8 is a flow diagram showing operations which the data processing system is programmed to perform in the second embodiment of the invention.

In the flow diagram of FIG. 8 the various items have the following significances.

80. Start.
81. Write ID of logging-on mobile station into field 56 of storage area 51. Set contents of shift registers SR and counters C to zero.
82. Set count in counter 53 to 1. Clear any list in storage area 52. Set contents of storage area 76 to the maximum value attainable by the contents of any of the counters C.
83. Is the count in counter 53 greater than the number p of frequencies in the relevant set of carrier frequencies, i.e. the number of frequencies which are available for inclusion in the hop sequence being chosen?
84. Is the count in counter 53 the same as a number already present in the part-sequence in field 57 of storage area 51?
85. Increment counter 53.
86. Does the count in counter 53 differ from the last number in the part-sequence in field 57 of storage area 51 by less than r?
87. Increment the count in that one of the counters C whose ordinal number corresponds to the current count in counter 53. Present the incrementation value to the data input of the first stage of that one of the shift registers SR whose ordinal number corresponds to the current count in counter 53.
88. Decrement the count in that one of the counters C whose ordinal number corresponds to the current count in counter 53 by the content of the last ((m−1)th) stage of that one of the shift registers SR whose ordinal number corresponds to the current count in counter 53. Clock this shift register.
89. Is l greater than (L−m), where l is the current length of the part-sequence in field 57 of storage area 51?
90. Does the count in counter 53 differ from the (m−(L−l))th number in the part-sequence in field 57 of storage area 51 by less than r?
91. Increment the count in that one of the counters C whose ordinal number corresponds to the current count in counter 53.
92. Is the count in that one of the counters C whose ordinal number corresponds to the current count in counter 53 greater than the contents of storage area 76?
93. Is the count in that one of the counters C whose ordinal number corresponds to the current count in counter 53 equal to the contents of storage area 76?
94. Write the contents of counter 53 into list 52 as the next entry.
95. Clear the contents of list 52. Write the contents of counter 53 into list 52 as the first entry. Replace the contents of storage area 76 by the count in that one of the counters C whose ordinal number corresponds to the current count in counter 53.
96. Calculate i where i=f(ID) modulo (number of entries in list 52). Add the ith entry in list 52 to the sequence in field 57 of area 51.
97. Is the current length l of the sequence in field 57 of area 51 equal to the required sequence length L?
98. Move the contents of the storage area 51 into an empty field 58 in storage area 50.
99. End.

After the ID of the logging-on mobile station has been written into field 56 of storage area 51 and various housekeeping tasks have been carried out in step 81, repeated circuits around the loop which includes step 85 result in successive entries being written into the storage area 52, i.e. into the list of possible candidates for the next frequency to be added to the hop sequence being built up for the mobile station in field 57 of storage area 51. Similarly to test 64 in FIG. 6, test 84 ensures that no frequency is included in the sequence more than once. Steps 86–95 have a similar but not identical overall function to steps 66–69 in FIG. 6, the difference being that, whereas steps 66–69 in FIG. 6 positively ensure that the minimum hop distance and minimum stay-away requirements are met for the next frequency to be added (with the consequence that the algorithm of FIG. 6 fails to form a complete sequence if no frequency which satisfies these requirements is available at any stage of the algorithm), steps 86–95 in FIG. 8 merely ensure that the requirements are met as nearly as possible, as will be elaborated upon below. Each time test 83 indicates that all possible candidates have been included in the list in storage area 52, i.e. that the updating of the list in storage area 52 has been completed, one of these candidates is chosen or selected in step 96 and added to the sequence being built up in field 57 of storage area 51. Test 97 then determines whether the sequence being built up is of the required length. If this is not the case (N) the procedure for choosing or selecting the next member of the sequence is started. Otherwise (Y) the ID of the logging on mobile station together with the hop sequence which has been chosen for it is written into an empty field 58 in storage area 50 in step 98.

As mentioned above, steps 86–95 in FIG. 8 ensure that the minimum hop distance and stay-away requirements are met as nearly as possible. The function of each of the counters C1, C2, . . . in FIG. 7 is to maintain a record of how nearly the corresponding carrier frequency would satisfy the minimum hop distance and minimum stay-away requirements if it were to be the next frequency to be added to the sequence being built up in field 57 of storage area 51. The lower the count in a given counter is, the more nearly the corresponding frequency would satisfy the requirements, a count of zero indicating that the corresponding frequency would satisfy the requirements completely. Steps 92–95 in FIG. 8 ensure that, each time test 83 indicates that all possible candidates have been included in the list in storage area 52, this list contains only those frequencies for which the counts in the corresponding counters are currently the lowest.

Steps 86–91 in FIG. 8 are concerned with maintaining the counts in the various counters C at appropriate values. Steps 86–88 in conjunction with the various shift registers SR in FIG. 7 ensure that, if a given carrier frequency would not satisfy the minimum hop distance requirement with respect to the immediately preceding member of the sequence being built up in field 57 of storage area 51 if it were chosen to be the next frequency to be added to the sequence, its counter C is incremented and this incrementation is maintained while a number of further members of the sequence equal to one less than the minimum stay-away time are chosen. For the choice of each of the frequencies near the end of the sequence steps 89–91 similarly ensure that a given counter C is incremented if the corresponding carrier frequency would lie within the minimum hop distance of that frequency which occurs at one less than the minimum stay-away time in a new cycle of the completed sequence if said corresponding carrier frequency were chosen to be the next frequency to be added to the sequence being built up in field 57 of storage area 51.

Many of the comments made above in respect of the first embodiment described with reference to FIGS. 5 and 6 apply also to the second embodiment described with reference to FIGS. 7 and 8. For example, in a similar manner to step 60 in FIG. 6, f(ID) in step 96 of FIG. 8 may be chosen to be equal to ID itself or, for example, may also be arranged to be a function of the position, in the sequence being chosen, of the frequency currently being selected, for example $f(ID)=\{M*(ID)+N+1\}$, where M is the ordinal number in the sequence of the frequency currently being chosen and N is the total number of carrier frequencies in the list from which the first member of the sequence is chosen. In a similar manner to the first embodiment, an alternative or additional way to increase the randomness of the frequencies in the sequence being chosen is to remove a randomly chosen selection of entries from the list 52 (and collapse the reduced list 52 which results) immediately prior to each of at least the first few occurrences of step 96. In the second embodiment another alternative or additional way to increase the randomness of the frequencies in the sequence being chosen is to increment the counts in a randomly chosen selection of the counters C during each of at least the first few implementations of step 82. This may be done, for example, in such manner that the number of counters C whose contents are incremented in this way each time is itself random, subject to a maximum which is decreased for each successive implementation of step 82. Again as another alternative, ID may be used to seed a pseudo-random number generator which is then clocked to generate the values of i used in the successive steps 96.

Similarly to the first embodiment, test 84 in FIG. 8 may be omitted if it is permissible for the same frequency to be included in the sequence more than once. Moreover, tests 86 and 90 in FIG. 8 may, if desired, be modified to additionally include a test for maximum hop distance, the value of which can be chosen in accordance with the prevailing circumstances.

Similarly to the first embodiment, it may be the case that the representations of the uplink and downlink hop sequences (the ordinal numbers in the banks BGU and BGD of the corresponding frequency generators) cannot be identical in respect of both the uplink sequence and the downlink sequence for each given mobile station. If this is so, for example because the first and second sets of carrier frequencies contain different numbers of these frequencies or because some of these frequencies are actually unusable, and/or because mutually different conditions are imposed on the uplink and downlink sequences in respect of their cycle lengths L, their minimum hop distances r, and/or their minimum stay-away times m, it will be necessary to implement the routine of FIG. 8 twice for each logging on mobile station, once to choose the uplink frequency-hop sequence therefor and once to choose the downlink frequency-hop sequence therefor. In such a case, similarly to FIG. 5, the sub-fields 55 of the fields 58 in FIG. 7 may comprise two parts 55A and 55B, one for storing the uplink sequences and the other for storing the downlink sequences, as indicated by a dashed line, and the field 57 of area 51 in FIG. 7 may comprise two parts 57A and 57B in a similar manner.

In both the first and the second embodiments a test of whether any frequency of the second set of (downlink) carrier frequencies should not be used because of interference may be carried out at the logging-on mobile station prior to it sending its log-on request, by programming its processing system 13 to tune its receiver RX to each frequency of the second set in turn at that time and measure the corresponding received signal levels, the result of the test being sent to the base station in association with the log-on request. A test of whether or not any frequency of the first set of (uplink) carrier frequencies should not be used because of interference may be carried out at the base station in a similar way upon reception by the base station of the log-on request, using a currently unused one of the base station's receivers RX. If the results of these tests indicate that one or more frequencies of the first and/or second sets should not be used, this or these frequencies can be excluded from any sequence being chosen by modifying step 64 of the flow diagram of FIG. 6 or step 84 of the flow diagram of FIG. 8 so that it tests also whether the count in counter 53 corresponds to any of these frequencies.

To cater for the fact that interference on the various carrier frequencies may change with time it may be arranged that the above tests are repeated periodically in respect of at least the frequencies included in the sequences assigned to the various logged-on mobile stations and, if it is found that any currently included frequency should no longer be used, a respective new sequence may be chosen in the manner described with reference to FIGS. 5 and 6, or in the manner described with reference to FIGS. 7 and 8, to replace each sequence which is affected. Alternatively any sequence which includes a frequency which has become unusable may be modified by simply replacing just that frequency with another frequency from the relevant set which is not currently present in the sequence, taking care that the newly included frequency satisfies the requirements concerning minimum hop distance and stay-away time with respect to the preceding and succeeding members of the cycling sequence at least to the maximum extent possible.

In both the first and the second embodiments the frequency hop sequences for each mobile station may be chosen in the relevant mobile station rather than in the base station if desired, or the downlink sequence may be chosen in the relevant mobile station and the uplink sequence (if represented differently) may be chosen in the base station. However, choosing all sequences in the base station will often be preferred, in the interests of keeping the processing which is required at each mobile station to a minimum. On the other hand, if the communications system were of an alternative kind which does not include a controlling base station, for example of a kind as described in the aforementioned patent application WO 96/00467, the respective frequency hop sequence used for reception by each station or node may be chosen in the corresponding node together with calculation of the respective frequency hop sequences required for transmission to the other stations or nodes, as described generally in WO 96/00467.

For simplicity it has been assumed or implied in both the first and the second embodiments that frequencies generated by the generators of the bank BGU in the mobile station of FIG. 3 are actually employed as carrier hop frequencies transmitted over the relevant uplink to the base station and, similarly, frequencies generated by the generators of the bank BGD in the base station of FIG. 4 are actually employed as carrier hop frequencies transmitted over the downlinks to the various mobile stations. This is not necessarily the case as, in practice, the transmitters TX in both the mobile stations and the base station may include mixers for up-converting the frequencies supplied to their inputs 25 for actual transmission. It has furthermore been assumed or implied that frequencies generated by the generators of the bank BGD in the mobile station of FIG. 3 are the same as hop frequencies which are received by the mobile station over the relevant downlink to the mobile station and, similarly, frequencies generated by the generators of the bank BGU in the base station of FIG. 4 are the same as hop frequencies which are received over the uplinks from the various mobile stations. Again this is not necessarily the case as, in practice, the receivers RX in both the mobile stations and the base station may include mixers for down-converting the received frequencies prior to demodulation using the frequencies supplied to their inputs 23. A consequence is that the frequencies generated by the generators of the banks BGU in the mobile stations are not necessarily the same as those generated by the bank BGU in the base station, although they will have the same spacing. Similarly, the frequencies generated by the generators of the banks BGD in the mobile stations are not necessarily the same as those generated by the bank BGD in the base station, although again they will have the same spacing.

In the present specification and claims the word "a" or "an" preceding an element does not exclude the presence of a plurality of such elements. Further, the word "comprising" does not exclude the presence of other elements or steps than those listed.

From reading the present disclosure, other modifications will be apparent to persons skilled in the art. Such modifications may involve other features which are already known in the design, manufacture and use of apparatus for generating a cyclic sequence of frequencies and components thereof and which may be used instead of or in addition to features already described herein.

The invention claimed is:

1. A method of generating a cyclic sequence of frequencies comprising:
   selecting a number of frequencies in succession from a list of usable frequencies by means of a sequence of indices indicating respective positions in the list,
   deriving said sequence of indices from a kernel,
   controlling a frequency generator arrangement to repeatedly generate the succession of frequencies so selected, and
   updating the list in respect of the frequencies contained therein, between successive selections of a frequency therefrom, the update being dependent upon the part of the succession of frequencies so far selected, wherein each updating is such as to result in a list which comprises a respective subset of the frequencies contained in the list from which the first frequency of the succession of frequencies was selected.

2. A method as claimed in claim 1, wherein each updating is such as to result in a list which contains a respective subset of the frequencies contained in the list from which the first frequency of the succession of frequencies was selected, wherein each updating is such as to result in a list from which is excluded any frequency which differs from the frequency last selected by less than a predetermined amount, and wherein the updating immediately prior to the selection of the last frequency of the succession is such as to result in a list from which is also excluded any frequency which differs from the frequency first selected by less than said predetermined amount.

3. A method as claimed in claim 2, wherein, if L denotes the length of the complete succession of frequencies, l denotes the length of the part of the succession of frequencies so far selected at any given time, and m is a predetermined integer greater than 1 and less than L,
   each updating which occurs when l<m is such as to result in a list from which is also excluded any frequency which differs from any frequency so far selected by less than said predetermined amount,
   each updating which occurs when m≦l<L is such as to result in a list from which is also excluded any frequency which differs from any of the (m−1) frequencies most recently selected by less than said predetermined amount, and
   each updating which occurs when (L−m)<l<L is such as to result in a list from which is also excluded any frequency which differs from any of the m−(L−l) frequencies first selected by less than said predetermined amount.

4. A method as claimed in claim 1, wherein each updating is such as to result in a list which contains a respective subset of the frequencies contained in the list from which the first frequency of the succession of frequencies was selected, and wherein, if L denotes the length of the complete succession of frequencies, l denotes the length of the part of the succession of L frequencies so far selected at any given time, and m is a predetermined integer greater than 1 and less than L,
   each updating which occurs when l<m is such as to result in a list from which is excluded all frequencies other than those which differ by less than a predetermined amount from the least number of the frequencies so far selected,
   each updating which occurs when m≦l≦(L−m) is such as to result in a list from which is excluded all frequencies other than those which differ by less than said predetermined amount from the least number of the (m−1) frequencies most recently selected, and
   each updating which occurs when (L−m)<l<L is such as to result in a list from which is excluded all frequencies other than those which differ by less than said predetermined amount from the least number of the (m−1) frequencies most recently selected and the m−(L−l) frequencies first selected.

5. A method as claimed in claim 1, wherein the value of each index i of the sequence of indices is given by $$i = |f(\text{ID})| \text{modulo } W$$

where ID is said kernel and W is the current length of the list.

6. A method as claimed in claim 5, wherein the value of each index i of the sequence of indices is a function of the ordinal number, in the succession of frequencies, of the frequency being selected by that index.

7. A method as claimed in claim 6, wherein the value of each index i is given by $$i=|M*(ID)+N+l|\mathrm{modulo}\ W$$

where M is the ordinal number, in the succession of frequencies, of the frequency being selected by that index, ID is non-zero, and N is the number of frequencies contained in the list from which the first frequency of the succession of frequencies is selected.

8. Apparatus for generating a cyclic sequence of frequencies, comprising a frequency selector for deriving a sequence of indices from a kernel and using these indices to indicate respective positions in a list of usable frequencies to thereby select a succession of frequencies from the list, and a frequency generator arrangement for repeatedly generating the succession of frequencies so selected, wherein the frequency selector includes a list updater for updating the list in respect of the frequencies contained therein between successive selections of a frequency therefrom in such manner that each updating is dependent upon the part of the succession of frequencies so far selected, wherein each updating is such as to result in a list which contains a respective subset of the frequencies contained in the list from which the first frequency of the succession of frequencies was selected.

9. A radio communication system which employs frequency hop sequences generated by a method as claimed in claim 1.

10. A radio communication system which includes apparatus as claimed in claim 8 for generating frequency hop sequences.

* * * * *